United States Patent
Kildegaard

(10) Patent No.: US 8,550,777 B2
(45) Date of Patent: Oct. 8, 2013

(54) WIND TURBINE BLADE AND BLADE ELEMENT COMBINATION AND METHOD OF CHANGING THE AERODYNAMIC PROFILE OF A WIND TURBINE BLADE

(75) Inventor: Casper Kildegaard, Kolding (DK)

(73) Assignee: LM Glasfiber A/S, Kolding (DK)

( * ) Notice: Subject to any disclaimer, the term of this patent is extended or adjusted under 35 U.S.C. 154(b) by 690 days.

(21) Appl. No.: 12/733,398

(22) PCT Filed: Aug. 29, 2008

(86) PCT No.: PCT/DK2008/000313
§ 371 (c)(1),
(2), (4) Date: Jun. 29, 2010

(87) PCT Pub. No.: WO2009/026929
PCT Pub. Date: Mar. 5, 2009

(65) Prior Publication Data
US 2010/0278657 A1  Nov. 4, 2010

(30) Foreign Application Priority Data
Aug. 29, 2007  (EP) .................................... 07388061

(51) Int. Cl.
*F03D 1/02*  (2006.01)
(52) U.S. Cl.
USPC .......................................................... 416/62
(58) Field of Classification Search
USPC ................. 416/62, 146 R, 224, 241 R, 223 A
See application file for complete search history.

(56) References Cited

U.S. PATENT DOCUMENTS

| 1,506,817 | A | 9/1924 | C. Dornier |
| 4,311,289 | A | 1/1982 | Finch |
| 5,328,329 | A | 7/1994 | Monroe |
| 7,608,939 | B2 * | 10/2009 | Bagepalli et al. ............... 290/55 |
| 2006/0280614 | A1 | 12/2006 | Quell et al. |

FOREIGN PATENT DOCUMENTS

| DE | 196 14 420 A1 | 10/1997 |
| DE | 198 54 741 C1 | 5/2000 |
| DE | 199 64 114 A1 | 7/2001 |

(Continued)

*Primary Examiner* — Nathaniel Wiehe
*Assistant Examiner* — Woody A Lee. Jr.
(74) *Attorney, Agent, or Firm* — Nath, Goldberg & Meyer; Jerald L. Meyer

(57) ABSTRACT

A blade element (42; 44; 46; 48; 150; 250; 350) for mounting on a wind turbine blade (10) is provided. The blade (10) has a longitudinal direction (L) and a chord extending transversely to the longitudinal direction between a leading edge (18) and a trailing edge (20). The blade (10) has an airfoil profile with a thickness between a suction side and a pressure side along at least a part of the longitudinal direction (L) and with a position of maximum thickness between the leading edge (18) and the trailing edge (20). The blade element (10) has a shape so that, by mounting in a first longitudinal part of the wind turbine blade (10), it changes the profile of the first longitudinal part from a first airfoil profile (100; 200; 300) with an essentially pointed trailing edge (100; 200; 300) and a first chord length ($c_{11}$; $c_{21}$; $c_{31}$) to a changed airfoil profile with a blunt trailing edge (153; 253; 353). The changed airfoil profile is a truncated profile of an imaginary airfoil profile (160; 260; 360) with an essentially pointed trailing edge and a second chord length ($c_{12}$; $c_{22}$; $c_{32}$), which is larger than the first chord length ($c_{11}$; $c_{21}$; $c_{31}$).

22 Claims, 4 Drawing Sheets

(56) References Cited

FOREIGN PATENT DOCUMENTS

| | | | |
|---|---|---|---|
| DE | 10 2006 034 831 A1 | 2/2007 | |
| EP | 1112928 A2 * | 6/2001 | ............ 416/62 |
| EP | 1 314 885 A1 | 5/2003 | |
| EP | 1 845 258 A1 | 10/2007 | |
| GB | 2 059 373 A | 4/1981 | |
| WO | WO 2007/071249 A1 | 6/2007 | |
| WO | WO 2007/118581 A1 | 10/2007 | |

* cited by examiner

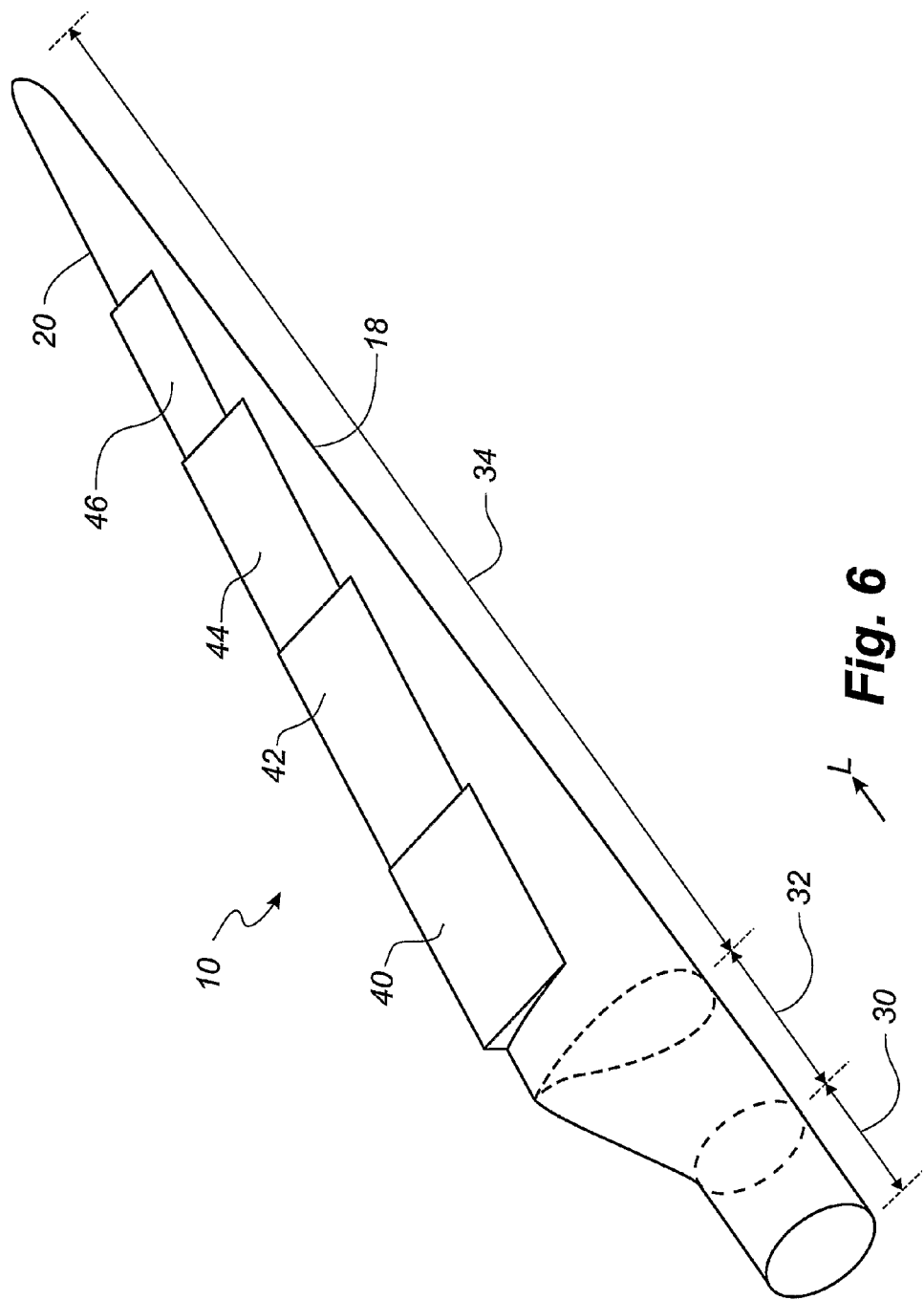

WIND TURBINE BLADE AND BLADE ELEMENT COMBINATION AND METHOD OF CHANGING THE AERODYNAMIC PROFILE OF A WIND TURBINE BLADE

This is a National Phase Application filed under 35 U.S.C. 371 as a national stage of PCT/DK2008/000313, filed on Aug. 29, 2008 and claims benefit to European Patent Application No. 07388061.9, filed on Aug. 29, 2007, the entire content of which is hereby incorporated by reference in its entirety.

TECHNICAL FIELD

The present invention relates to a wind turbine blade and blade element combination comprising: a wind turbine blade having a longitudinal direction and a chord extending transversely to the longitudinal direction between a leading edge and a trailing edge, the blade comprising an airfoil profile with a thickness between a suction side and a pressure side along at least a part of the longitudinal direction and with a position of maximum thickness between the leading edge and the trailing edge, and a blade element mounted at the trailing edge of the blade in a first longitudinal part of the wind turbine blade. The invention further relates to a method of changing the aerodynamic profile of a wind turbine blade.

BACKGROUND

Over the years, the construction of blades for wind turbines has developed towards a shape, where the blade (when mounted on the wind turbine) consists of a root area closest to a hub of the wind turbine, a profiled area or airfoil area furthest away from the hub and a transition area between the root area and the airfoil/profiled area. The airfoil area has an ideal or almost ideal blade shape, whereas the root area has a substantially circular cross-section, which reduces the loads from gusts of air and makes it easier and safer to mount the blade to the hub. The root area diameter is typically constant along the entire root area. As is suggested by the name, the transition area has a shape gradually changing from the circular shape of the root area to the airfoil profile of the airfoil area. Typically, the width of the transition area increases substantially linearly with increasing distance from the hub.

As mentioned, the profiled area or airfoil area has an ideal or almost ideal blade shape, for instance shaped as a typical aeroplane wing. Typically, the cross-section of the blade in the airfoil area is shaped as a typical airfoil profile with a suction side and a pressure side and a chord extending, as seen transversely to the longitudinal direction of the blade, between a leading edge and a trailing edge, where the leading edge is rounded with a given nose radius and the trailing edge has an essentially pointed shape. However, it is also possible to reduce the width of the blade by truncating the blade in the area of the trailing edge, the cross-section thus forming a truncated profile of an imaginary airfoil with an essentially pointed trailing edge. In this situation, the air flows departing at the truncated part of the blade from the pressure side and the suction side, respectively, can meet each other at the trailing edge of the imaginary airfoil profile. Thus, the air flows "see" the truncated profile as the imaginary profile. Such a truncated profile has the advantage that the transverse surface area of the blade profile is reduced, thus reducing loads from wind gusts but at the same time maintaining an "aerodynamic width", which corresponds to the chord length of the imaginary profile. The total lift generated by the truncated profile is substantially the same as a profile without the truncation, since the part of the blade generating the highest lift has been maintained. Additionally, the strength of the trailing edge of the blade profile is increased due to the profile being thicker at the trailing edge. Such a blade is for instance disclosed in DE19614420.

Wind turbine customers have different demands to the size and functionality of the wind turbine depending on the intended use and the intended place of operation. Therefore, the demands to the size, such as length and solidity, as well as functionality, such as lift and drag coefficients, of wind turbine blades also varies greatly. Consequently, manufacturers of wind turbine blades need to have a large number of different moulds for producing the wind turbine blades, which are typically manufactured as a shell member of fibre-reinforced polymer.

US 2006/280614 A1 discloses a rotor blade fitted with stall fences in form of planar elements protruding from the suction side of the rotor blades in zones of a transversal flow.

DE 199 64 114 A1 discloses an airfoil profile, which is fitted with a divergent trailing edge in form of Gurney flap, which creates a periodic flow disturbance.

EP-A-1 314 885 discloses a wind turbine blade provided a flexible serrated trailing edge. The document discloses an embodiment with a Gurney flap.

DE 198 54 741 C1 discloses a trailing edge wedge for an aircraft wing, which is attached at the downwardly facing wing surface at the trailing edge. The edge wedge compensates for asymmetric aircraft characteristics due to unavoidable manufacturing tolerances.

DISCLOSURE OF THE INVENTION

It is an object of the invention to provide a new blade for a rotor of a wind turbine with a blade element mounted on the surface of the blade, and which overcomes or ameliorates at least one of the disadvantages of the prior art or which provides a useful alternative.

This is according to a first aspect of the invention achieved by a wind turbine blade and a blade element combination, wherein the blade element has a shape so that, when mounted in a first longitudinal part of the wind turbine blade, it changes the profile of the first longitudinal part from a first airfoil profile with an essentially pointed trailing edge and a first chord length to a changed airfoil profile with a blunt trailing edge, the changed airfoil profile being a truncated profile of an imaginary airfoil profile with an essentially pointed trailing edge and a second chord length being larger than the first chord length. Thus, it is possible to change the "aerodynamic width" of the airfoil profile in the first longitudinal part of the blade by retrofit mounting the blade element on the surface at the trailing edge of the blade. That is, the wind turbine blade (without the blade element mounted on the surface) has a first aerodynamic width in the first longitudinal part of the blade being substantially the same as the chord length, whereas the retrofitted blade element changes the aerodynamic width of the first longitudinal part to a second aerodynamic width being larger than the first aerodynamic width. Thereby, a wind turbine blade and blade element combination is provided having a profile, which is aerodynamically wider than the airfoil profile of the wind turbine blade itself.

Thereby, the manufacturer of wind turbine blades needs only to maintain a number of basis moulds for producing a number of basis blade types, which can be retrofitted or modified by mounting the blade elements at the trailing edge of such a basis blade type in order to change the aerodynamic properties to the desired specifications.

Preferably, the wind turbine blade comprises a profiled contour that when being impacted by an incident airflow generates a lift, the profiled contour being divided into: a root area with a substantially circular profile nearest a root end of the blade, an airfoil area with a lift generating profile and comprising the airfoil profile furthest away from the root end and nearest a tip end of the blade, and optionally a transition area between the root area and the airfoil area, the profile of the transition area gradually changing in the radial direction from the circular profile of the root area to the lift generating profile of the airfoil area.

According to an advantageous embodiment, the blade element is mounted in the airfoil area of the blade only, i.e. the first longitudinal part comprising the airfoil profile is contained in the airfoil area entirely.

According to a further embodiment of the blade element, the thickness of the changed airfoil profile is continuously decreasing from the position of maximum thickness to the trailing edge. That is, the blade element does not provide a protrusion on the changed blade profile, but changes the blade profile into another smooth airfoil profile.

Preferably, the blade element has at least one surface, which is adapted to fit to the contour of a wind turbine blade. The blade element can be adhered to the surface of the wind turbine by gluing or similar methods. Alternatively, the blade element can be moulded on to the wind turbine blade. The blade element may also be mechanically coupled to the surface of the wind turbine blade.

According to an advantageous embodiment, the blade element comprises a mounting surface, a flow surface, and a blunt rear edge. The mounting surface is adapted for mounting to the surface of the wind turbine blade, the flow surface is part of the surface of the changed airfoil profile, and the blunt rear edge corresponds to the blunt trailing edge of the changed airfoil profile. Preferably, the mounting surface fits to at least a part of the contour of the wind turbine blade.

According to another advantageous embodiment, the flow surface is continuous. Thus, the flow surface has a substantially smooth surface. Advantageously, the flow surface is continuously connected to the airfoil profile of the blade, i.e. the flow surface has a smooth transition to the surface of the wind turbine blade. Thus, the blade element may comprise a starting point, where a tangent to the flow surface and a tangent to the surface of the wind turbine blade are substantially coinciding.

According to another embodiment, the distance between the mounting surface and the flow surface is increasing towards the blunt rear edge. The blade element may for example have a substantially wedge shaped cross-section.

According to an advantageous embodiment, the longitudinal extent of the blade element and the first longitudinal part of the blade is at least 1 meter, or at least 3 meters, or at least 5 meters, or at least 7 meters, or at least 10 meters. The blade may be provided with a number of such blade elements, for instance two, three, four, or five. However, it may be advantageous to retrofit only a single blade element along a large extent of the airfoil area. Thus, the blade element may even have a length of 15 meters, 20 meters, 25 meters, 30 meters or even further.

According to a first embodiment of the blade element, the blunt trailing edge has a thickness, which is at least 5% of the maximum thickness of the blade profile. The thickness of the blunt trailing edge can also be at least 10%, 15%, 20% or 25% of the maximum thickness of the blade profile.

According to another embodiment of the invention, the blade element when mounted on the wind turbine blade extends along at least 5% of the chord. The blade element can also extend along at least 10%, 15%, 20%, 25%, or 30% of the chord.

According to yet another embodiment of the blade element, the second chord length is at least 5% larger than the first chord length. The second chord length can also be at least 10%, 15%, 20%, 25%, or 30% larger than the first chord length.

According to one embodiment of the blade element, the blade element is adapted for mounting on the pressure side of the blade. Thus, the blade element is mounted with the mounting surface on the pressure side of the blade, and the flow surface becomes part of the pressure side of the changed airfoil profile. This type of blade element is for instance suitable for changing the profile of the blade to an airfoil profile with a so-called after-camber, where the airfoil profile is bent distinctly towards the pressure side of the blade near the trailing edge of the blade.

According to another embodiment, the blade element is adapted for mounting on the suction side of the blade. Thus, the blade element is mounted with the mounting surface on the suction side of the blade, and the flow surface becomes part of the suction side of the changed airfoil profile. This type of blade element is for instance suitable for changing the profile of the blade to a so-called flat back profile, where the trailing edge is "cut open", and the pressure side and the suction side of the profile are "pulled apart".

According to yet another embodiment, the blade element is adapted to being mounted about the trailing edge of the blade, so that a first part of the element extends along the pressure side of the blade, and a second part extends along the suction side of the blade. Thus, the blade element is mounted with the mounting surface on both the pressure side and the suction side of the blade. The blade further comprises a first flow surface becoming part of the pressure side of the changed airfoil profile, and a second flow surface becoming part of the suction side of the changed airfoil profile. This type of blade element is for instance suitable for changing the profile of the blade to a so-called truncated profile, where the imaginary profile is wider than the first airfoil profile, and where the chords of the first airfoil profile and the imaginary airfoil profile are substantially coinciding.

According to an additional aspect, the invention provides a wind turbine rotor comprising at least one, preferably two or three, of the aforementioned wind turbine blade and blade element combinations. According to a further aspect, the invention provides a wind turbine comprising at least one of the aforementioned wind turbine blade and blade element combinations or the aforementioned wind turbine rotor. Thereby, a wind turbine having a potentially higher power output than a wind turbine with non-modified wind turbine blades is provided.

According to yet another further aspect, the invention provides a method of changing the aerodynamic profile of at least a first longitudinal part of a wind turbine blade, wherein the method comprises the steps of: a) providing a wind turbine blade with a first airfoil profile in the first longitudinal part of the wind turbine blade and having a leading edge and a trailing edge, the first airfoil profile having an essentially pointed trailing edge and having a first chord length, and b) mounting a blade element on the wind turbine blade at the trailing edge of the first longitudinal part of the blade, the blade element changing the profile of the first longitudinal part to a changed airfoil profile with a blunt trailing edge, the changed airfoil profile being a truncated profile of an imaginary airfoil profile with an essentially pointed trailing edge and having a second chord length being larger than the first chord length. Any of the previously described embodiments of the blade element may be used in the method.

Typically, the wind turbine blade is manufactured as a shell member of fibre-reinforced polymer, such as glass fibres, carbon fibres, plastic fibres or plant fibres impregnated with epoxy, polyester or vinylester, optionally with a core material, such as foamed polymer or balsawood.

The blade element can for instance be manufactured as a sandwich structure having a core material, such as PVC foam or balsa wood, covered with a fibre layer impregnated with polymer. That is, the blade element can be made of the same material as the wind turbine blade.

BRIEF DESCRIPTION OF THE DRAWINGS

The invention is explained in detail below with reference to the drawings, in which.

DETAILED DESCRIPTION OF THE INVENTION

Figure 1:
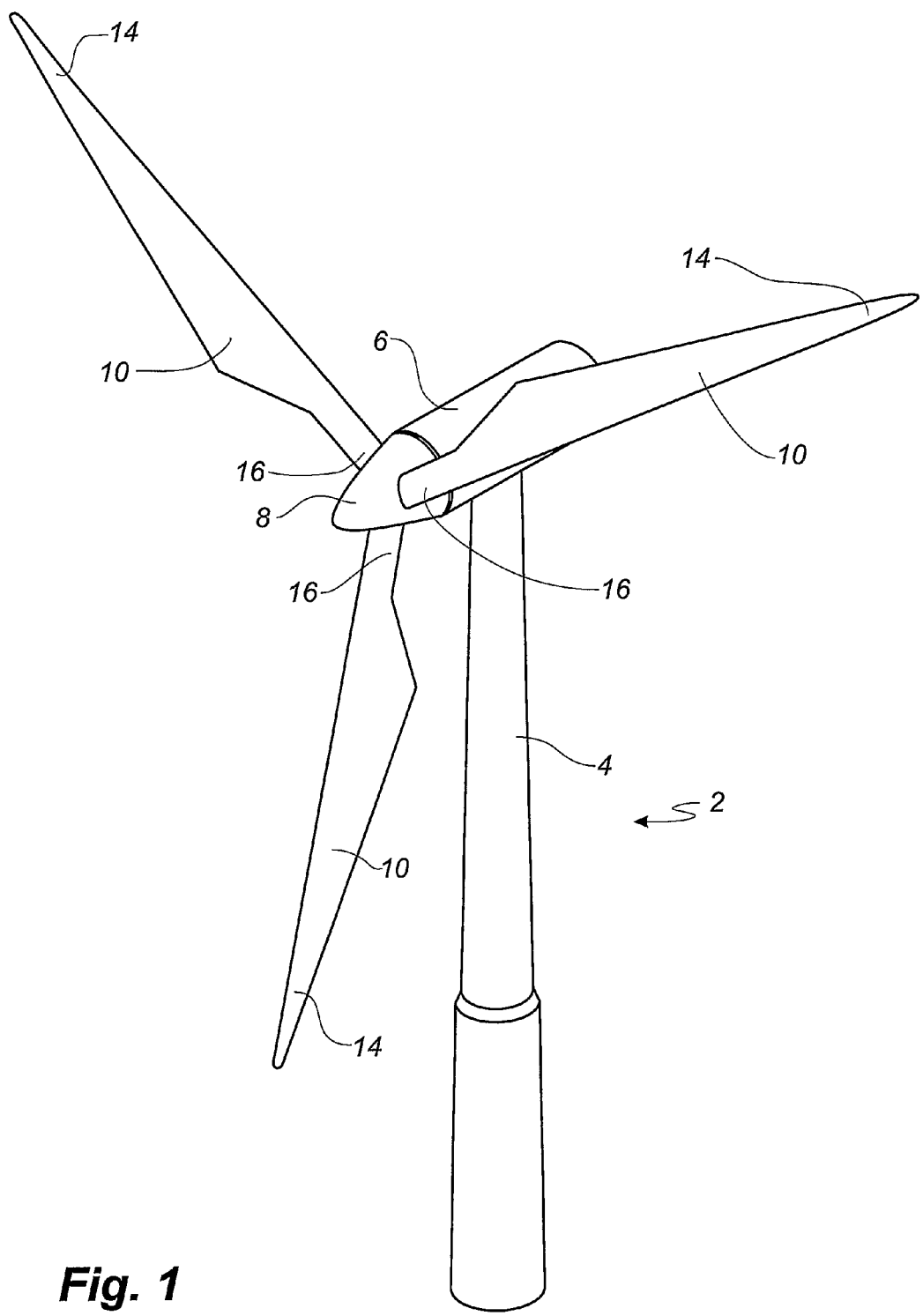
FIG. 1 shows a wind turbine, FIG. 2 a schematic view of an airfoil profile, FIG. 3 a first blade element according to the invention mounted on the suction side of a wind turbine blade, FIG. 4 a second blade element according to the invention mounted on the pressure side of a wind turbine blade, FIG. 5 a third blade element according to the invention mounted about the trailing edge of the blade of a wind turbine blade, and FIG. 6 a schematic view of an embodiment of a wind turbine blade and blade element combination according to the invention.

FIG. 1 illustrates a conventional modern wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
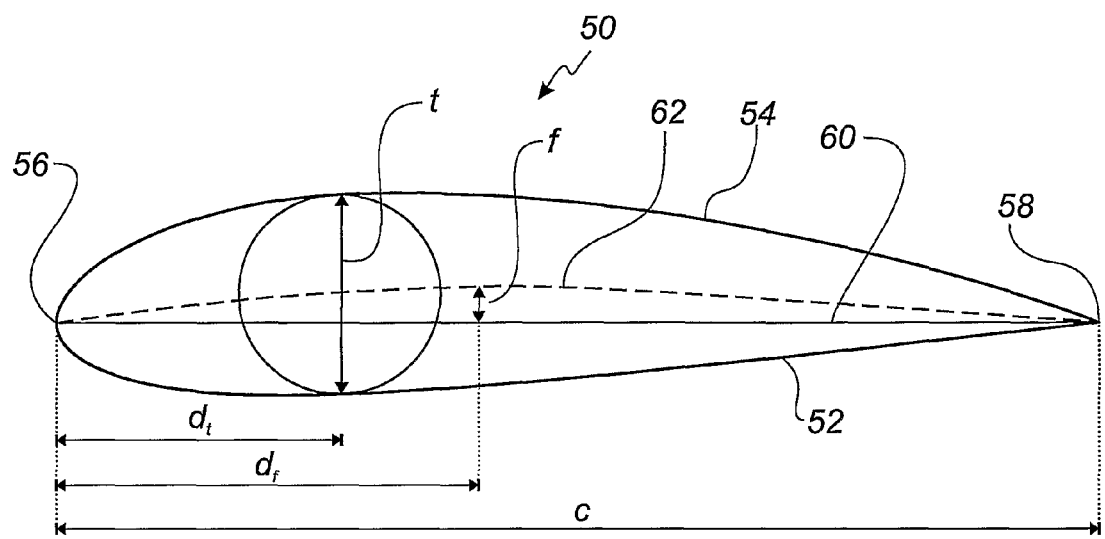

FIG. 2 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward side and the leeward side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c.

Figure 3:
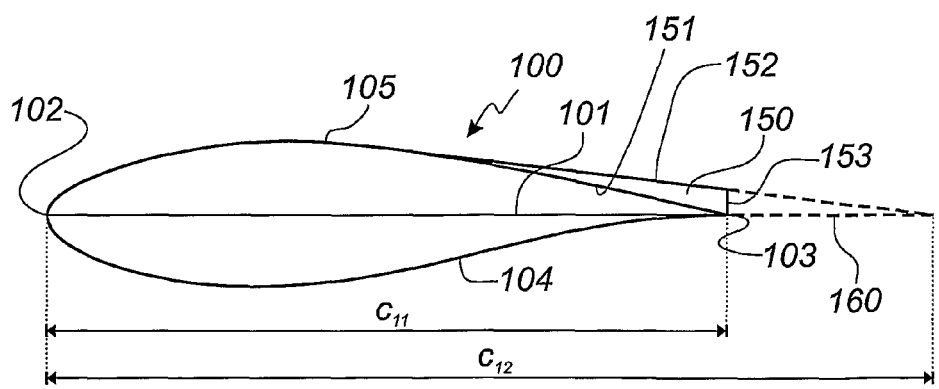

FIG. 3 shows the cross-section of a first embodiment of a blade element 150 according to the invention mounted at the trailing edge of a wind turbine blade. The wind turbine blade has a first airfoil profile 100 with a pressure side 104 and a suction side 105. The first airfoil profile 100 has a chord 101 with a first chord length $c_{11}$ extending between a leading edge 102 and a trailing edge 103 of the blade. The blade element 150 is mounted near the trailing edge 103 of the blade on the suction side 105 of the blade, thereby changing the airfoil profile to a changed airfoil profile with a blunt trailing edge 153. The blade element 150 comprises a first surface 151, which is adapted to fit the contour of the suction side 105 of the blade, and a second surface 152, which—when the blade element 150 is mounted on the blade—constitutes part of the suction side of the changed profile. The changed airfoil profile is a truncated profile of an imaginary airfoil profile 160 with an essentially pointed trailing edge and having a second chord length $c_{12}$, which is larger than the first chord length $c_{11}$.

This blade element 150 is suitable for changing the profile of a longitudinal part of the blade to a so-called flat-back profile, where the trailing edge is cut open and the suction side and the pressure side are pulled away from each other, thus providing a profile, where the pressure side and the suction side are nearly parallel (or flat) near the trailing edge.

Figure 4:
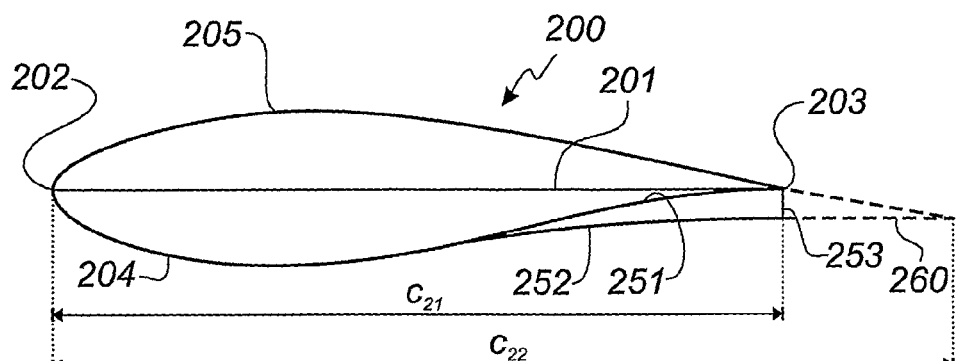

FIG. 4 shows the cross-section of a second embodiment of a blade element 250 according to the invention mounted at the trailing edge of a wind turbine blade. The wind turbine blade has a first airfoil profile 200 with a pressure side 204 and a suction side 205. The first airfoil profile 200 has a chord 201 with a first chord length $c_{21}$ extending between a leading edge 202 and a trailing edge 203 of the blade. The blade element 250 is mounted near the trailing edge 203 of the blade on the pressure side 204 of the blade, thereby changing the airfoil profile to a changed airfoil profile with a blunt trailing edge 253. The blade element 250 comprises a first surface 251, which is adapted to fit the contour of the pressure side 204 of the blade, and a second surface 252, which—when the blade element 250 is mounted on the blade—constitutes part of the pressure side of the changed profile. The changed airfoil profile is a truncated profile of an imaginary airfoil profile 260 with an essentially pointed trailing edge and having a second chord length $c_{22}$, which is larger than the first chord length $c_{21}$.

This blade element 250 is suitable for changing the profile of a longitudinal part of the blade to a profile with a so-called after-camber, where the median camber line bends distinctly towards the pressure side of the blade near the trailing edge of the blade.

Figure 5:
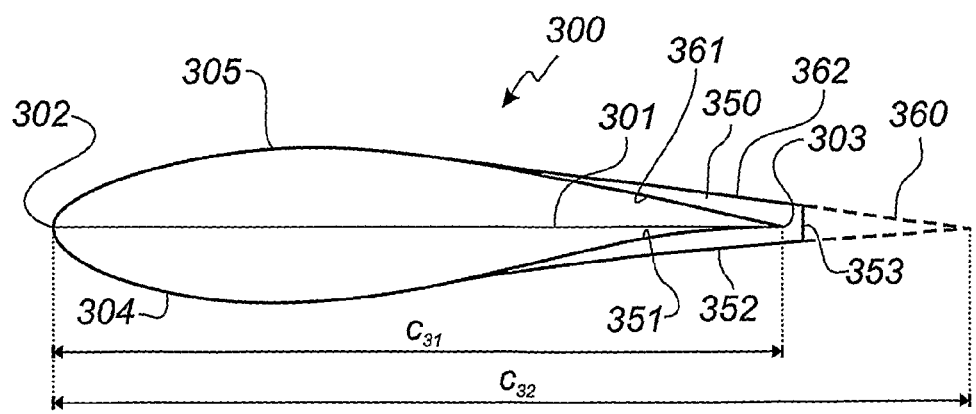

FIG. 5 shows the cross-section of a third embodiment of a blade element 350 according to the invention mounted about the trailing edge of a wind turbine blade. The wind turbine blade has a first airfoil profile 300 with a pressure side 304 and a suction side 305. The first airfoil profile 300 has a chord 301 with a first chord length $c_{31}$ extending between a leading edge 302 and a trailing edge 303 of the blade. The blade element 350 is mounted about the trailing edge 303 of the blade with a first part extending along the pressure side 304 of the blade and a second part extending along the suction side 305 of the blade, thereby changing the airfoil profile to a changed airfoil profile with a blunt trailing edge 353. The blade element 350 comprises a first surface 351, which is adapted to fit the contour of the pressure side 304 of the blade, and a second surface 352, which—when the blade element 350 is mounted on the blade—constitutes part of the pressure side of the changed profile. The blade element 350 additionally comprises a third surface 361, which is adapted to fit the contour of the suction side 305 of the blade, and a fourth surface 362, which—when the blade element 350 is mounted on the blade—constitutes part of the suction side of the changed profile.

The changed airfoil profile is a truncated profile of an imaginary airfoil profile 360 with an essentially pointed trailing edge and having a second chord length $c_{32}$, which is larger than the first chord length $c_{31}$.

This blade element 350 is suitable for changing the profile of a longitudinal part of the blade to a shape, where the imaginary airfoil profile 360 has a profile, which is wider than but otherwise similar to the first airfoil profile 300. That is, the chords of the first airfoil profile and the imaginary airfoil profile can be substantially coinciding.

The trailing edge of the changed profiles of FIGS. 3 and 4 can also lie behind the trailing edge of the profile itself similar to the embodiment of FIG. 5. That is, the blade element may extend beyond the blade profile.

FIG. 6 shows a schematic view of an embodiment of a wind turbine blade and blade element combination according to the invention. The wind turbine blade and blade element combination comprises a wind turbine blade 10 and a first blade element 40, a second blade element 42, a third blade element 44, and a fourth blade element 46 mounted on the suction side of the wind turbine blade 10.

The wind turbine blade 10 is a conventional wind turbine blade and comprises a root area 30 closest to the hub, a profiled or an airfoil area 34 furthest away from the hub and a transition area 32 between the root area 30 and the airfoil area 34. The blade 10 comprises a leading edge 18 facing the direction of rotation of the blade 10, when the blade is mounted on the hub, and a trailing edge 20 facing in the opposite direction to the leading edge 18.

The airfoil area 34 (also called the profiled area) has an ideal or almost ideal blade shape with respect to generating lift, whereas the root area 30 has a substantially circular cross-section, which reduces loads from wind gusts and makes it easier and safer to mount the blade 10 to the hub. The diameter of the root area 30 is typically constant along the entire root area 30. The transition area 32 has a shape gradually changing from the circular shape of the root area 30 to the airfoil profile of the airfoil area 34. The width of the transition area 32 increases substantially linearly with increasing distance L from the hub.

The airfoil area 34 has an airfoil profile with a chord extending between the leading edge 18 and the trailing edge 20 of the blade 10. The width of the chord decreases with increasing distance L from the hub. It should be noted that the chords of different sections of the blade do not necessarily lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The first blade element 40, the second blade element 42, the third blade element 44, and the fourth element 46 change the profile of four different longitudinal parts of the blade 10, respectively. Alternatively, the blade elements can be provided as a single blade element extending along a large longitudinal part of the blade 10 and having a profile, which changes in the longitudinal direction L in order to fit the changing profile of the blade in the longitudinal direction L.

The four blade elements 42, 44, 46, 48 are in FIG. 6 depicted as being mounted on the suction side of the blade 10. However, the blade elements 42, 44, 46, 48 can of course be of any of the various types depicted in FIGS. 3-5. Furthermore, the blade elements 42, 44, 46, 48 are depicted as being mutually abutting. However, it is also possible to mount the blade elements in such a manner that some or all of them are mutually separated in the longitudinal direction L of the blade 10.

The wind turbine blade and blade element combinations as shown in FIG. 6 are thus intended to replace the conventional blades of for instance a wind turbine as shown in FIG. 1.

The invention also provides a method of changing the aerodynamic profile of at least a first longitudinal part of a wind turbine blade, for instance by mounting one of the blade elements shown in FIGS. 3-5 in the first longitudinal part at the trailing edge of the blade. Thereby, it is possible to change the cross-section of the first longitudinal part of the wind turbine blade from a first airfoil profile having a leading edge and trailing edge, where the first airfoil profile has an essentially pointed trailing edge, to a changed airfoil profile with a blunt trailing edge, and where the changed airfoil profile is a truncated profile of an imaginary airfoil profile with an essentially pointed trailing edge. Thus, it is possible to increase the "aerodynamic width" as seen from the air flows from the pressure side and the suction side, respectively, by mounting such a blade element on the surface of the wind turbine blade. The first longitudinal part can for instance be any of the regions in which any of the blade elements 42, 44, 46, 48 as shown in FIG. 6 are placed.

It is also clear from the description that the blade elements can be used to change the aerodynamic properties of any conventional wind turbines by mounting a blade element according to the invention on the blades of already installed wind turbines.

The invention has been described with reference to a preferred embodiment. However, the scope of the invention is not limited to the illustrated embodiment, and alterations and modifications can be carried out without deviating from the scope of the invention. The blade elements are for instance also suitable for mounting on a wind turbine blade having a truncated airfoil profile. Thus, the blade element can change the profile from having a truncated profile of a first imaginary airfoil profile with a substantially pointed trailing edge with a first chord length to a changed truncated profile of a second imaginary airfoil profile with a substantially pointed trailing edge with a second chord length being larger than the first chord length. Also, it is conceivable to provide a blade element of the type, which is adapted to fit about the trailing edge of the blade (similar to the embodiment shown in FIG. 5), and which changes the profile from a first airfoil profile with an essentially pointed trailing edge to a changed profile with an essentially pointed trailing edge, i.e. that the changed profile is coinciding with the imaginary profile.

| List of reference numerals | |
| --- | --- |
| 2 | wind turbine |
| 4 | tower |
| 6 | nacelle |
| 8 | hub |
| 10 | blade |
| 14 | blade tip |
| 16 | blade root |
| 18 | leading edge |
| 20 | trailing edge |

-continued

| List of reference numerals | |
|---|---|
| 30 | root area |
| 32 | transition area |
| 34 | airfoil area |
| 40 | first blade element |
| 42 | second blade element |
| 44 | third blade element |
| 46 | fourth blade element |
| 50 | airfoil profile |
| 52 | pressure side |
| 54 | suction side |
| 56 | leading edge |
| 58 | trailing edge |
| 60 | chord |
| 62 | camber line/median line |
| 100, 200, 300 | first airfoil profile |
| 101, 201, 301 | first chord |
| 102, 202, 302 | leading edge |
| 103, 203, 303 | trailing edge |
| 104, 204, 204 | pressure side |
| 105, 205, 305 | suction side |
| 150, 250, 350 | blade element |
| 151, 251, 351 | first surface/mounting surface |
| 152, 252, 352 | second surface/flow surface |
| 153, 253, 353 | blunt trailing edge/rear edge |
| 160, 260, 360 | imaginary airfoil profile |
| 361 | third surface |
| 362 | fourth surface |
| c | chord length |
| $d_t$ | position of maximum thickness |
| $d_f$ | position of maximum camber |
| t | thickness |
| f | camber |

The invention claimed is:

1. A wind turbine blade and blade element combination comprising: a wind turbine blade (10) having a longitudinal direction (L) and a chord extending transversely to the longitudinal direction between a leading edge (18) and a trailing edge (20), the blade (10) comprising an airfoil profile with a thickness between a suction side and a pressure side along at least a part of the longitudinal direction and with a position of maximum thickness between the leading edge and the trailing edge, and a blade element (42; 44; 46; 48; 150; 250; 350) mounted at the trailing edge (20) of the blade (10) in a first longitudinal part of the wind turbine blade (10), characterised in that the blade element (10) has a shape so that, when mounted in a first longitudinal part of the wind turbine blade (10), it changes the profile of the first longitudinal part from a first airfoil profile (100; 200; 300) with an essentially pointed trailing edge (100; 200; 300) and a first chord length ($c_{11}$; $c_{21}$; $c_{31}$) to a changed airfoil profile with a blunt trailing edge (153; 253; 353), the changed airfoil profile being a truncated profile of a continuous second airfoil profile (160; 260; 360) with an essentially pointed trailing edge and a second chord length ($c_{12}$; $c_{22}$; $c_{32}$) being larger than the first chord length ($c_{11}$; $c_{21}$; $c_{31}$) wherein the second airfoil profile is coincident with the first airfoil profile in the region of the blade not covered by the blade element, wherein the longitudinal extent of the blade element and the first longitudinal part of the blade is at least 1 meter and wherein the blade element (42; 44; 46; 48; 150; 250; 350), when mounted on the wind turbine blade, extends along at least 5% of the chord.

2. A wind turbine blade and blade element combination according to claim 1, wherein the blade comprises: a profiled contour that when being impacted by an incident airflow generates a lift, the profiled contour being divided into: a root area (30) with a substantially circular profile nearest a root end of the blade, an airfoil area (34) with a lift generating profile and comprising the airfoil profile furthest away from the root end and nearest a tip end, and optionally a transition area (32) between the root area (30) and the airfoil area (34), the profile of the transition area (32) gradually changing in the radial direction from the circular profile of the root area to the lift generating profile of the airfoil area.

3. A wind turbine blade and blade element combination according to claim 2, wherein the blade element is mounted in the airfoil area of the blade only.

4. A wind turbine blade and blade element combination according to claim 1, wherein the thickness of the changed airfoil profile is continuously decreasing from the position of maximum thickness to the blunt trailing edge (153; 253; 353).

5. A wind turbine blade and blade element combination according to claim 1, wherein the blade element comprises a mounting surface (151; 251; 351), a flow surface (152; 252; 353), and a blunt rear edge (153; 253; 353).

6. A wind turbine blade and blade element combination according to claim 5, wherein the mounting surface (151; 251; 351) fits to at least a part of the contour of the blade.

7. A wind turbine blade and blade element combination according to claim 5, wherein the flow surface is continuous.

8. A wind turbine blade and blade element combination according to claim 5, wherein the flow surface is continuously connected to the airfoil profile of the blade.

9. A wind turbine blade and blade element combination according to claim 5, wherein the distance between the mounting surface and the flow surface is increasing towards the blunt rear edge.

10. A wind turbine blade and blade element combination according to claim 1, wherein the longitudinal extent of the blade element and the first longitudinal part of the blade is at least 3 meters.

11. A wind turbine blade and blade element combination according to claim 1, wherein the blunt trailing edge (153; 253; 353) has a thickness, which is at least 5% of the maximum thickness of the blade profile.

12. A wind turbine blade and blade element combination according to claim 1, wherein the blade element (42; 44; 46; 48; 150; 250; 350), when mounted on the wind turbine blade, extends along at least 10% of the chord.

13. A wind turbine blade and blade element combination according to claim 1, wherein the second chord length ($c_{12}$; $c_{22}$; $c_{32}$) is at least 5% larger than the first chord length ($c_{11}$; $c_{21}$; $c_{31}$).

14. A wind turbine blade and blade element combination according to claim 1, wherein the blade element (42; 44; 46; 48; 150; 250; 350) is adapted for mounting on the pressure side of the blade.

15. A wind turbine blade and blade element combination according to claim 1, wherein the blade element is adapted for mounting on the suction side of the blade.

16. A wind turbine blade and blade element combination according to claim 1, wherein the blade element is adapted to being mounted about the trailing edge of the blade, so that a first part of the element extends along the pressure side of the blade, and a second part extends along the suction side of the blade.

17. Wind turbine rotor comprising at least one, preferably three, wind turbine blade and blade element combinations according to claim 1.

18. Wind turbine comprising: a) at least one wind turbine blade and blade element combination according to claim 1; or b) a wind turbine rotor comprising at least one, wind turbine blade and blade element combinations according to claim 1.

19. A wind turbine blade and blade element according to claim 1, wherein the blade element has a wedge-shaped cross-section.

20. A wind turbine rotor comprising three wind turbine blade and blade element combinations according to claim 1.

21. A method of changing the aerodynamic profile of at least a first longitudinal part of a wind turbine blade, characterised in that the method comprises the steps of: a) providing a wind turbine blade with a first airfoil profile in the first longitudinal part of the wind turbine blade and having a leading edge and a trailing edge, the first airfoil profile having an essentially pointed trailing edge and having a first chord length, and b) mounting a blade element on the wind turbine blade at the trailing edge of the first longitudinal part of the blade, the blade element changing the profile of the first longitudinal part to a changed airfoil profile with a blunt trailing edge, the changed airfoil profile being a truncated profile of a continuous second airfoil profile with an essentially pointed trailing edge and having a second chord length being larger than the first chord length wherein the second airfoil profile is coincident with the first airfoil profile in the region of the blade not covered by the blade element.

22. A wind turbine blade and blade element combination comprising: a wind turbine blade (10) having a longitudinal direction (L) and a chord extending transversely to the longitudinal direction between a leading edge (18) and a trailing edge (20), the blade (10) comprising an airfoil profile with a thickness between a suction side and a pressure side along at least a part of the longitudinal direction and with a position of maximum thickness between the leading edge and the trailing edge, and a blade element (42; 44; 46; 48; 150; 250; 350) mounted at the trailing edge (20) of the blade (10) in a first longitudinal part of the wind turbine blade (10), characterised in that the blade element (10) has a shape so that, when mounted in a first longitudinal part of the wind turbine blade (10), it changes the profile of the first longitudinal part from a first airfoil profile (100; 200; 300) with an essentially pointed trailing edge (100; 200; 300) and a first chord length ($c_{11}$; $c_{21}$; $c_{31}$) wherein the second airfoil profile is coincident with the first airfoil profile in the region of the blade not covered by the blade element to a changed airfoil profile with a blunt trailing edge (153; 253; 353), the changed airfoil profile being a truncated profile of a continuous second airfoil profile (160; 260; 360) with an essentially pointed trailing edge and a second chord length ($c_{12}$; $c_{22}$; $c_{32}$) being larger than the first chord length ($c_{11}$; $c_{21}$; $c_{31}$), wherein the thickness of the changed airfoil profile is continuously decreasing from the position of maximum thickness to the blunt trailing edge, and wherein the longitudinal extent of the blade element and the first longitudinal part of the blade is at least 1 meter and wherein the blade element (42; 44; 46; 48; 150; 250; 350), when mounted on the wind turbine blade, extends along at least 5% of the chord.

* * * * *

UNITED STATES PATENT AND TRADEMARK OFFICE
CERTIFICATE OF CORRECTION

PATENT NO. : 8,550,777 B2  Page 1 of 1
APPLICATION NO. : 12/733398
DATED : October 8, 2013
INVENTOR(S) : Casper Kildegaard It is certified that error appears in the above-identified patent and that said Letters Patent is hereby corrected as shown below:

In the Claims:

-Claim 2, Column 10, Line 1, after "and", and before "a"

Please delete "optionally"

Signed and Sealed this
Twenty-eighth Day of January, 2014

Michelle K. Lee
*Deputy Director of the United States Patent and Trademark Office*